Dec. 8, 1953 R. H. CAMPBELL 2,662,115

INTERCOMMUNICATING APPARATUS

Filed May 3, 1948 3 Sheets-Sheet 1

INVENTOR.

Richard H. Campbell

BY

Mason, Kolehmainen, Rathburn & Wyss

Attorneys

Dec. 8, 1953 R. H. CAMPBELL 2,662,115

INTERCOMMUNICATING APPARATUS

Filed May 3, 1948 3 Sheets-Sheet 2

INVENTOR.

Richard H. Campbell

BY Mason, Kolehmainen, Rathburn & Wyss

Attorneys

INVENTOR.
Richard H. Campbell
BY
Mason, Kolehmainen, Rathburn & Wyss
Attorneys

Patented Dec. 8, 1953

2,662,115

UNITED STATES PATENT OFFICE 2,662,115

INTERCOMMUNICATING APPARATUS

Richard H. Campbell, Racine, Wis., assignor to Webster Electric Company, Racine, Wis., a corporation of Delaware Application May 3, 1948, Serial No. 24,785

10 Claims. (Cl. 179—1)

The present invention relates to intercommunicating systems and to apparatus for use in such systems.

One of the objects of the present invention is to provide a new and improved system as well as units for the system including a number of stations or units so constructed and arranged so as to prevent amplifiers at the stations from being cascaded or connected to each other in series, i. e., to prevent what for convenience may be called double amplification.

Another object of the present invention is to provide a new and improved intercommunicating system as well as units for such a system in which a communication circuit at the calling station is opened in the event a busy station is selected and automatically completed when the busy condition ends.

A further object of the present invention is the provision of a new and improved intercommunicating system and apparatus for use therein wherein double amplification is prevented by means including either a single or two current responsive means, one of which may be a sensitive one.

Another object of the present invention is to provide new and improved communication apparatus wherein busy station responsive means is provided to connect electroacoustical translating means to a communication circuit either through a communication direction controlling switch or independently of the switch.

A further object of the present invention it to provide a new and improved intercommunicating system including audible busy signal means.

A still further object of the present invention is to provide a new and improved intercommunicating system including a plurality of stations of a first type including amplifying means and a plurality of stations of a second type having no amplifying means, and wherein the stations of the second type have means for indicating whether or not stations of the first type are busy and also have means for calling stations of the first type.

Figure 1:
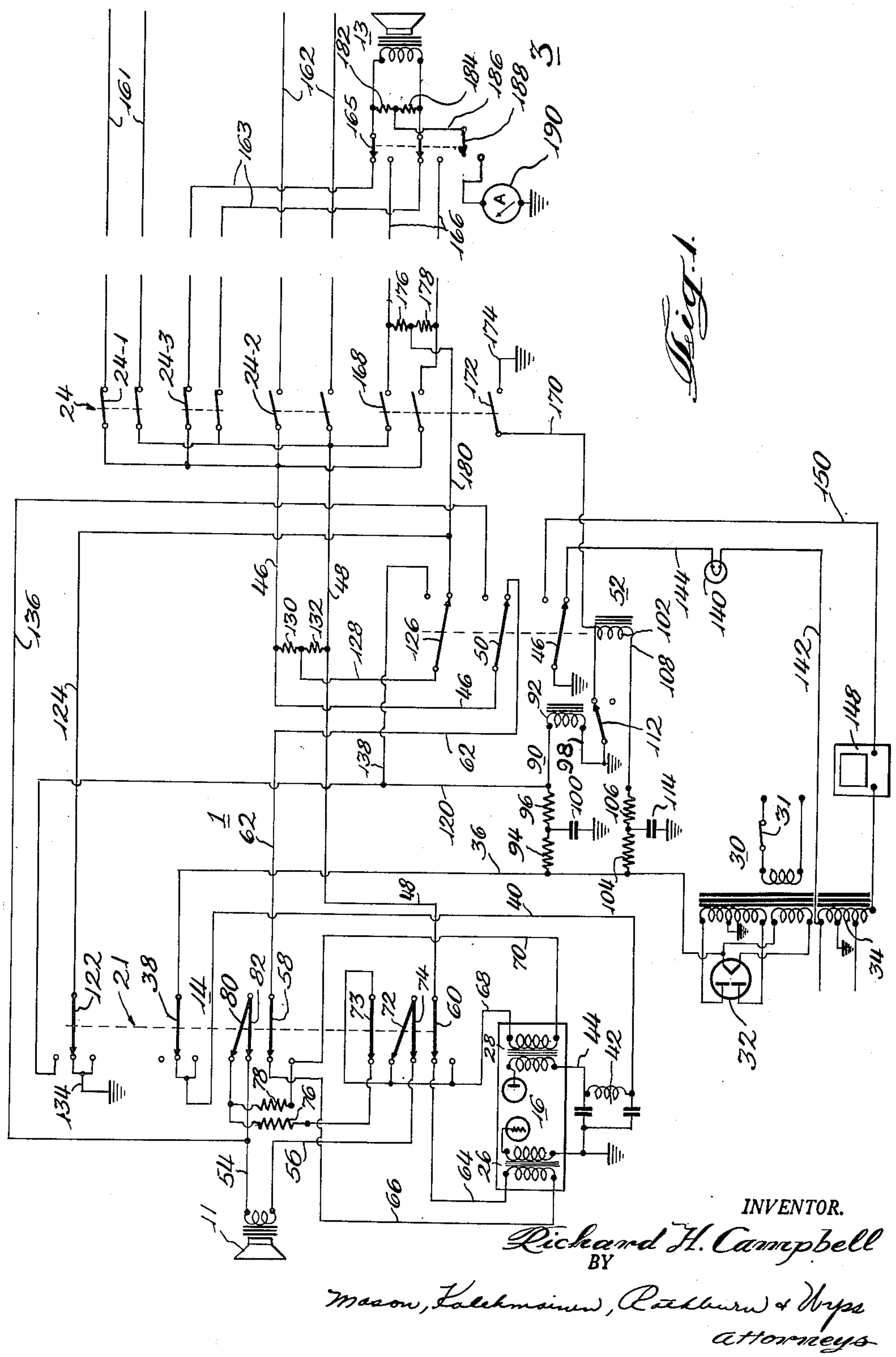
Figure 2:
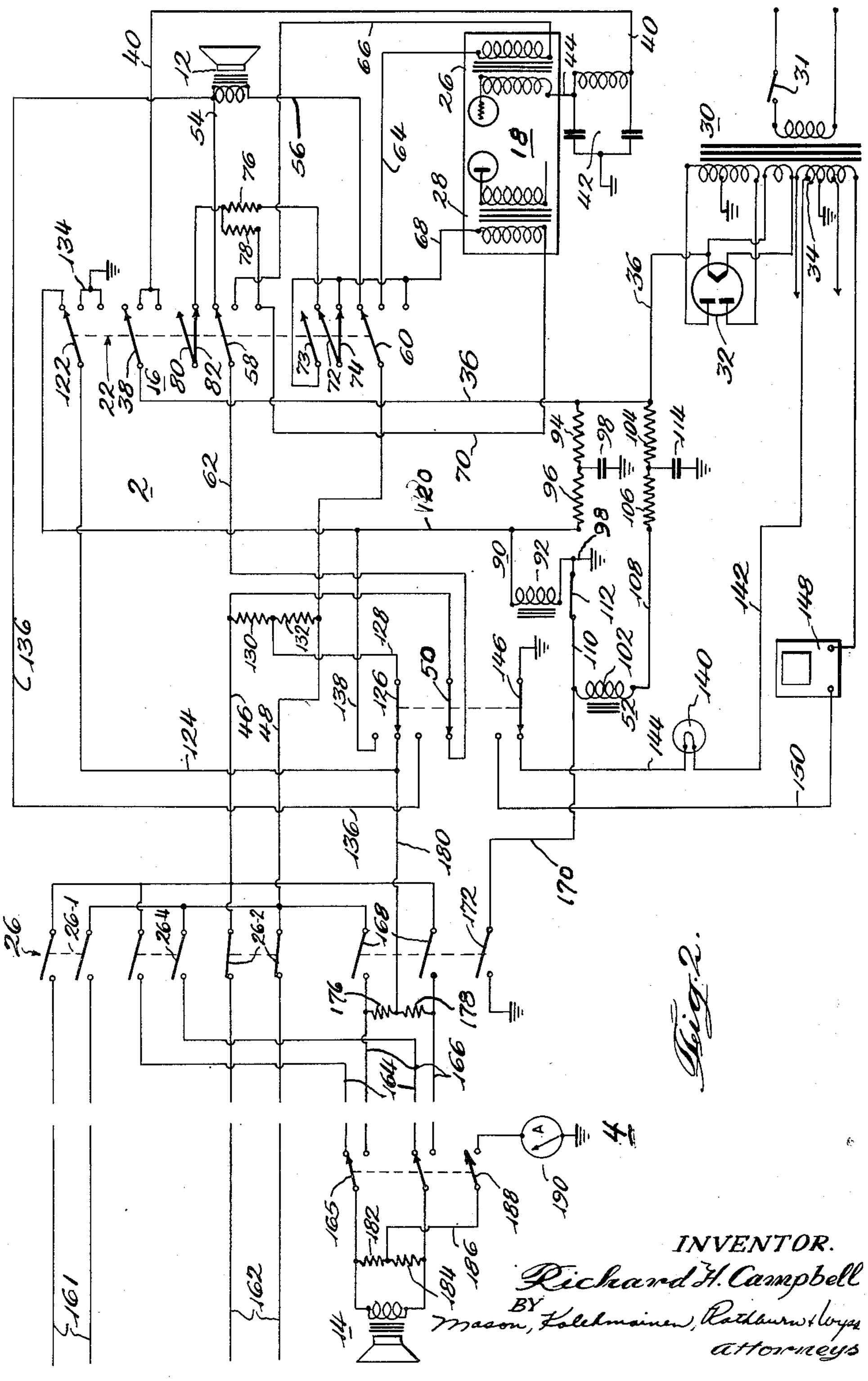
Figures 3, 4:
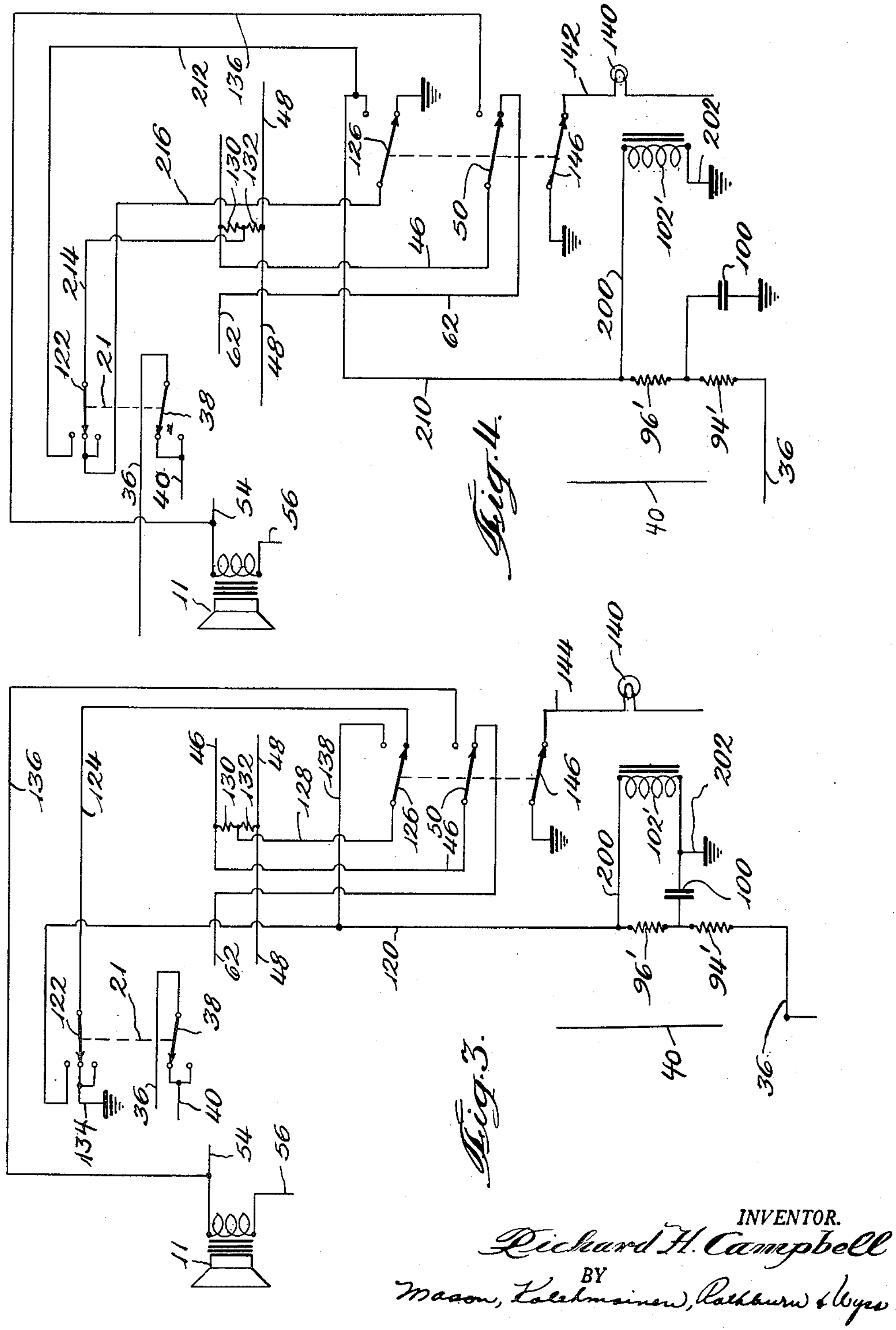

Other objects and advantages of the present invention will become apparent from the ensuing description of illustrative embodiments thereof, in the course of which reference is had to the accompanying drawings, in which:

Figs. 1 and 2 constitute, when placed alongside each other, a diagrammatic representation of a communication system embodying the invention; and Figs. 3 and 4 are fragmentary views of modified portions of the apparatus shown in Fig. 1.

Referring now to Figs. 1 and 2, it may be noted that the illustrated system is of the loud-speaking type, wherein communication can be carried on alternately in opposite directions between a plurality of central or master stations under the control of manually operable communication direction control switches thereat; and wherein communication may be carried on between a master station and one or more remote or substations under the control of the communication direction control switch at a master station. The master stations are indicated by the reference characters 1 and 2 and the substations by reference characters 3 and 4.

All the stations provided with electroacoustical translating devices capable of being utilized both as transmitters and receivers, such as the loudspeakers 11 to 14, inclusive, which may be of the well known permanent magnet type. The master stations are provided with amplifiers 16 and 18 communication direction control switches 21 and 22, and station selector switches indicated generally by reference characters 24 and 26 for selecting other master or substations.

In order to simplify further detailed description of the apparatus at the master stations, the apparatus at but one station will be described and like elements at both will be indicated by like reference characters.

The amplifier (and reference is now had particularly to station 1) may be of any well known construction and has, therefore, not been illustrated in detail. It is believed sufficient to say that it comprises an input transformer 26 and an output transformer 28. Power is supplied to it from a suitable source of alternating current through transformer 30 and in part through a rectifier comprising the tube 32 and energized from the transformer. The filaments of the amplifier tubes are supplied from transformer secondary winding 34, while the rectifier output (the plate voltage supply) is supplied to the tubes under the control of the communication direction control switch 21 (22 at station 2), the arrangement being such that the circuits are completed when the switch is in two of its three positions. These two positions are the talk and listen positions. When the switch is in these positions, the plate circuits are completed through conductor 36, switch blade 38 operable with and physically forming part of the communuication control switch, conductor 40 filter 42, and conductor 44.

The communication direction control switch is as already briefly indicated, operable into three positions, these being the listen position (an intermediate position in which switch 21 is indicated), an idle position (an upper position in which switch 22 is indicated), and a talk position, which is the lowermost of the three positions shown.

In the idle position (in which switch 22 of station 2 is shown) of the communication control switch, the loudspeaker is connected to a communication circuit comprising conductors 46 and 48 adapted to be connected to the interstation circuits through a selector switch 24 and the amplifier is inoperative because switch 38 disconnects the plate voltage supply. In the listen position (in which switch 21 of station 1 is shown), the communication circuit 46, 48 is connected to the input of the amplifier and the output of the amplifier is connnected to the loud-speaker. In the talk position, the connections of the circuit and loud-speaker to the amplifier are reversed. In both the talk and listen positions, the plate voltage supply is completed, as already described.

In the idle position of the communication direction control switch 21, loud-speaker 11 is connected to the communication circuit 46, 48 through the switch 21 and a switch blade 50 forming part of a first current responsive means 52, forming an important feature of the present invention. The connection includes conductors 54 and 56 connected to switch blades 58 and 60 of switch 21 (in its idle position). Switch blade 60 is connected directly to the communication circuit conductor 48 and switch blade 58 is connected to conductor 46 through conductor 62 and switch blade 50 in its normal position, in which it is shown at both stations 1 and 2. In this idle position of the communication direction control switch, the amplifier input circuit which includes conductors 64 and 66 is open, while the amplifier output circuit which includes conductors 68 and 70, is shorted by switch blades 72 and 74 of the communication direction control switch through resistors 76 and 78. Also, the plate supply voltage is discontinued because switch 38 is open.

In the listen position of the communication direction control switch, the input of the amplifier is connected to the communication circuit 46, 48 through conductors 64, 66, switch blades 60 and 58, conductor 48, and conductor 62, and switch blade 50. The amplifier output is connected to loud-speaker 11 through conductors 68 and 70, the switch blades 72, 73, 74 and 80, 82 of the communication direction control switch, resistors 76 and 78, and conductors 54 and 56. It should be noted that resistor 78 is in series with the loud-speaker, whereas resistor 76 is in parallel with it.

In the talk position of the communication direction control switch, the loud-speaker is connected to the input and the communication circuit to the output of the amplifier. The input of the amplifier is connected to the loudspeaker through conductors 66 and 64, switch blades 80, 82 and 72, 74, and conductors 54 and 56. The output is connected to circuit 46, 48 through conductors 68 and 70 and switch blades 58 and 60, which are connected to conductors 62 and 48 and thus to the communication circuit.

One of the primary features of the present invention resides in the provision of new and improved means for indicating whether or not a selected station is busy at a calling or selecting station and for preventing connection of the amplifier at the calling station to a busy station. This new and improved means automatically breaks the communication circuit 46, 48, so that the amplifier at the calling station cannot be connected to a called busy station. Thus, it is impossible to connect the amplifiers in series and double amplification is avoided. One of the advantages of breaking the circuit 46, 48 is that neither the amplifier input nor amplifier output can be connected to a called station so that even hum from the amplifier output cannot be placed on the called station line. A further feature of the present invention is that the calling station amplifier is reconnected to the communication circuit automatically when the calling station is no longer busy.

In the embodiment of the invention illustrated in Figs. 1 and 2, two current responsive means are utilized, whereas in the embodiments of Figs. 3 and 4, but a single current responsive means is used. Of the two current responsive means in the system of Figs. 1 and 2, the first, which has been indicated by reference character 52, operates a number of switches and is controlled by a second, indicated by reference character 90, which is a more sensitive device.

The current responsive means of relay 90 is normally energized whenever the apparatus is in operation, as it is whenever the power supply switch 31 is closed to energize the transformer 30. When this is done, the relay winding 92 is connected across the plate voltage supply through conductor 36, the series connected resistors 94 and 96 and the ground connection 98. A filter condenser 100 is connected across ground and the junction of the two resistors.

The relay 90 energizes the winding 102 of relay 52 in its energized or operated position. At this time the winding 102 is connected across the plate voltage supply through conductor 36, the series connected resistors 104 and 106, and conductor 108 leading to one terminal of the winding, the other terminal of which is connected to ground through conductor 110, switch blade 112 of relay 90, and ground connection 98. A filter condenser 114 is connected between ground and the junction of resistors 104 and 106.

The arrangement of the current responsive means is such that if a busy station is selected with the communication direction control switch in its uppermost or idle position, which is also its selecting position, the relays 90 and 52 are deenergized and remain deenergized as long as the selected station is busy and even though the communication direction control switch be moved from its selecting to its talk or listen positions. When the relays are deenergized, the communication circuit 46, 48 is broken so that the amplifier cannot be connected to it, and the loud-speaker is preferably kept connected to the communication circuit so that the calling station can listen to the communication between the busy stations. Also, visual and audible signals are operated at the calling station.

The current responsive means are connected to the communication circuit in the idle position of the communication direction control switch through conductor 120, switch blade 122 in its uppermost position, conductor 124, switch blade 126 forming part of the relay 52, conductor 128, and the resistors 130 and 132 connected across circuit 46, 48 and to the junction of which conductor 128 is connected.

The relay 90 is deenergized when a busy station is selected by connection thereof to ground so that the current flow through it is decreased to a point where it no longer remains in its operated position. The grounding is effected through the called busy station at which the circuit 46, 48 and, therefore, the interstation used at any particular time, is grounded through the switch 122 in its talk or listen positions, whereat it connects the communication circuit to ground through the previously referred to circuit including switch 126, conductor 124, and the ground connection 134. The connection of the circuit 46, 48 to ground is illustrated in Fig. 1, in which the communication direction control switch is illustrated in its listen position.

When the current responsive means are deenergized in response to the selection of a busy station, the communication circuit 46, 48 is broken, the loud-speaker is connected to the communication circuit independently of the communication direction controlling switch, the relays are connected to the communication circuit independently of the communication direction control switch, and visual and audible signals are operated.

The communication circuit 46, 48 is broken by switch 50, which is connected to conductor 46. When operated, the switch 50 also connects the loud-speaker to the circuit 46, 48 through conductor 136 so that the speaker remains connected to circuit 46, 48 as it was in the idle or selecting position.

The current responsive means are connected to the communication circuit independently of switch 21 through conductor 138, the switch blade 126 in its uppermost position, conductor 128, and resistors 130 and 132.

The visual indication is provided by the deenergization of a normally lighted pilot light 140. The light is normally connected across a portion of the secondary winding 34 through a circuit including conductor 142, conductor 144, and a third switch blade 146 of relay 52, which is connected to ground. When the relay 52 is deenergized upon the selection of a busy station, the switch 146 moves to its other position to deenergize the light 140 and to complete an energizing circuit for a buzzer 148 which is connected across another portion of secondary winding 34 through conductor 150. The switch blades 126 and 146 are of the shorting type, i. e., they make before break.

The system embodying the present invention may include a number of central or master stations, although but two have been illustrated. The stations are interconnected by a plurality of interstation circuits, and each station is preferably connected to an interstation circuit individual to it. Thus, station 1 is connected to an interstation circuit 161 individual to it by a normally closed station selector switch 24—1. Station 2 is connected to its individual interstation circuit 162 by the selector switch 26—2. Station 1 has a selector switch 24—2 for selecting station 2, and station 2 has a selector switch 26—1 for selecting station 1. If more stations are used, more station selector switches and interstation circuits are provided.

The system illustrated in Figs. 1 and 2 also includes the two substations 3 and 4. Station 3 is shown arranged so that it can be called from station 1, and station 4 is arranged so that it can be called from station 2. The interstation circuits individual to stations 3 and 4 are indicated by reference characters 163 and 164, respectively, and circuits to them can be completed through the selector switches 24—3 and 26—4.

The remote stations can also call the master stations and they are provided with means for indicating whether or not the called master station is busy. Thus, each of the substations includes a two-position switch 165 normally connecting the loud-speaker to its associated interstation circuit and operable to connect the loud-speaker to a "call-in" line 166 leading to the master station and used for signalling and, if desired, for communication. When the call-in line is used for communication, it is connected to communication circuit 46, 48 by switch 168 at the central station. When this switch is closed, relay 52 is permanently energized through the resistors 104 and 106 and a ground connection completed through conductor 170, switch blade 172 operable simultaneously with the switch 168, and conductor 174. The call-in line conductors are joined by the series connected resistors 176 and 178, the junction of which is connected by conductor 180 to conductor 124, which, it may be remembered, is connected to the plate voltage supply when the communication direction control switch is in its idle position. The substation circuit has the series connected resistors 182 and 184 connected across it and the junction of these may be connected to ground through conductor 186, switch blade 188 operable with switch 165, and the meter 190, which may be a low resistance meter.

The operation of the system illustrated in Figs. 1 and 2 will now be reviewed as a whole. In this description, it is assumed that the power switches 31 at the master stations 1 and 2 are closed, thus placing the apparatus in operation. The relays 52 and 90 are energized with the result that switch blades 50, 126 and 146 are in their indicated positions. The pilot lights 140 are energized through circuits including switch blades 146. The communication circuits 46, 48 are completed through switch blades 50 and switch blades 126 connect the communication circuits to the switch blades 122.

It is assumed further that stations 1 and 3 are communicating with each other, as shown in Fig. 1. For example, it can be assumed that station 1 called station 3. This can be done by closure of the selector switch 24—3 at station 1 connecting circuit 163 individual to station 3 to the circuit 46, 48. In the indicated position of the communication direction control switch 21, the loud-speaker 13 is connected to the input of amplifier 16 and loud-speaker 11 to the output through circuits previously described in detail. The plate voltage supply is completed through switch blade 38 so that communication can be carried on between stations 1 and 3 under the control of the communication direction control switch 21 at station 1.

When station 1 is conditioned for communication with another station, the communication circuit 46, 48, and thus all interstation circuits connected thereto, in this case circuits 161 and 163, are connected to ground through switch blade 126 of relay 52 and switch blade 122 of switch 21. If another station, such as station 2, selects station 1, the communication circuit at station 2 will be broken and the busy signals thereat operated.

Assume now that station 2 selects station 1 when the latter is busy. The selection is made with the switch 22 in its indicated idle or selecting position. In this position, the relay 90 is connected to the station 2 communication circuit 46, 48 through switch blades 122 and 126. Then, when the selection is actually made by the closure of selector switch 26—1, the high potential end of relay 90 is connected to ground through the circuit including the interstation circuit 161, the circuit 46, 48 at station 1 and switch blades 126 and 122 at station 1. As a result, the energization of relay 90 is reduced to a value such that it is released or returned to nonoperated position. Switch 112 of the relay thus opens and deenergizes relay winding 102 and the switch blades 50, 126 and 146 of the relay are returned, as by a spring, to their other positions. Circuit 46, 48 is broken by switch 50 and the relay 90 is connected by switch blade 126 and conductors 138 and 128 to the circuit 46, 48, thereby to prevent operation of relay 90 even though the circuit through switch blade 122 be broken by operation of the switch 22 to its talk or listen positions. The pilot light 140 is deenergized and the buzzer 148 energized by switch blade 146. The loudspeaker 12 remains connected to the interstation circuit through switch blade 50 so that the operator at station 2 can listen in on the busy line.

The amplifier cannot be connected to the interstation circuit as long as station 1 remains busy, because of the opening of circuit 46 by switch 50. Thus, double amplification is prevented. Furthermore, the arrangement is such that the communication circuit is automatically reclosed as soon as station 1 is no longer busy, and this is true no mattter what position the switch 22 is left in. When station 1 is no longer busy, i. e., the switch 21 is returned to its idle position, then the ground is removed from the interstation circuit and relay 90 is energized and operates to close switch 112. Relay 52 immediately operates to return to its indicated position, thus apprising the operator at station 2 that station 1 is no longer busy.

A substation can also call a master station, as will now be reviewed in connection with a call from station 4 to station 2. To make the call, the switches 165 and 188 are operated to connect the meter 190 to circuit 166, which is connected through conductors 180, 124, switch 122, and conductor 120 to the plate voltage supply at station 2. As a consequence, the meter gives a reading and indicates that station 2 is not busy. At the same time the relay 90 is grounded through the meter, which is of low resistance, with the result that relay 52 is deenergized and the light 140 deenergized and the buzzer 148 is operated to give both visual and audible indications that station 2 is being called from a substation. To answer the call, the switch 168 is closed. The switch 172 is closed simultaneously to reconnect winding 102 of relay 52 to the plate voltage supply, thereby to complete the communication circuit so that the switch 22 can be operated to effect communication with station 4. The communication can be carried on through switch 165 in its displaced position and with switch 168 closed or the operator at station 2 can ascertain which substation is calling and thereafter close the corresponding station selector switch 26 and open switch 168, after which communication can be carried on just as though the master station had originated the call.

In the event station 2 is busy when station 4 calls it, the switch 122 is connected to ground so that when switches 165 and 188 at station 4 are closed, the meter 190 gives no reading.

There is thus provided an indication at station 4 that station 2 is busy.

Fig. 3 illustrates in fragmentary form a modified apparatus at a central station. The main difference between the apparatus of Fig. 3 and that described above at stations 1 and 2 is that but a single relay 102′ is utilized. It operates the switches 50, 126 and 146, as before, but instead of being controlled by a relay corresponding to the relay 90 it is connected to the plate voltage supply by a conductor 200 and the ground connection 202. The resistors 94′ and 96′ correspond generally to the resistors 94 and 96 except that they may have lower values, for example, of about 24,000 ohms each, as compared with 62,000 ohms each for the previously described resistors. The relay windings 102 and 102′ may both have resistances in the neighborhood of 10,000 ohms. The embodiment of Fig. 3 does not include any substations and, therefore, the switches 168 and 172 and the interstation circuit 166 have not been shown. Also, the audible signal means 148 has been omitted.

The operation of a system including a number of stations like the one illustrated in Fig. 3 is similar to that described above in connection with Figs. 1 and 2, except that the relay winding 102′ is connected to the communication circuit and operates the switches 50, 126 and 146. In other words, one relay takes the place of two.

The embodiment of Fig. 4 is similar to that of Fig. 3 in that one relay winding 102′ is used, but differs from it in the connection of that winding to the communication circuit and to the communication direction control switch 122. The switches 50 and 146 are connected and operate as in Fig. 3.

The relay winding 102′ is connected to the communication circuit in the idle position of the switch 21 through the switch blade 122, the connection being effected through conductors 210, 212, switch blade 122 in its uppermost or idle position, conductor 214, and the resistors 130 and 132. When a busy station is selected, the winding 102′ is connected to ground, as before, with the result that the switch blades 50, 126 and 146 are returned to their nonoperated positions. As long as switch 21 remains in its idle position, the relay winding 102′ remains connected to the communication circuit 46, 48, as previously described. If the switch is operated to its listen or talk positions, then the relay winding 102′ is connected to the communication circuit through conductor 210, switch blade 126, conductor 216, switch blade 122 (now in its indicated position), and conductor 214. As a result, the relay winding 102′ remains nonoperated no matter what the position of switch 21, as long as the station is connected to a busy station.

While the present invention has been described in connection with the details of three illustrative embodiments thereof, it should be understood that these details are not intended to be limitative of the invention, except in so far as set forth in the accompanying claims.

Having thus described my invention, what I claim as new and desire to secure by Letters Patent of the United States is:

1. An intercommunicating system including a plurality of stations, interstation circuits connecting said stations, amplifying means having an input and an output and a plural position communication direction controlling switch means and a two way communication circuit, and amplifying means input and output circuits; controlled by it at each station for completing the connections of said interstation circuits to the input and output of said amplifying means in a plurality of positions of said switch means; circuit means at each station associated with its said switch means for placing its interstation circuit in one of a plurality of current conducting "busy" condition when the station is communicating with another, each of said communication direction controlling switches being operable also to a further station selecting position, and means including said switch means in said selecting position and current responsive means at each station controlled in response to the busy condition of a selected interstation circuit for breaking said controlled circuit when said busy condition obtains and for completing said circuit when said busy condition ends.

2. In a multiple station intercommunicating system, the combination including, means including interstation communication circuits, an electroacoustical translating device, a multiposition communication controlling switch means and an amplifier having input and output connections at each station controlled by the switch means thereat enabling the device to be connected to a circuit or the amplifier input or output and the circuit to the amplifier output or input, respectively, for establishing communication circuits between stations, each station including also normally closed switch means in the circuit between said communication controlling switch means and interstation circuits, a first current responsive means, means operably connecting said first current responsive means to said normally closed switch means and operable to open the latter, a second current responsive means and circuits controlled thereby for controlling the energization of said first current responsive means, means including a switch controlled by said communication controlling switch means for connecting said second current responsive means to a communication circuit when said switch means connects the device to a communication circuit, means including switch means operable by said communication controlling switch means for grounding the interstation communication circuit when said device is connected to said amplifier, whereby the second current responsive means at a station selecting another station whereat the device is connected to the amplifier is grounded and operated to operate the first current responsive means to open said normally closed switch means, and means including switch means operable by said first current responsive means for connecting said second current responsive means to the circuit when said first current responsive means is operated.

3. In a multiple station intercommunicating system, the combination including, means including interstation communication circuits, and an electroacoustical translating device, a multiposition communication controlling switch means and an amplifier having input and output connections at each station controlled by the switch means thereat enabling the device to be connected to a circuit or the amplifier input or output and the circuit to the amplifier output or input, respectively, for establishing communication circuits between stations, each station including also normally closed switch means in the circuit between said communication controlling switch means and interstation circuits, a single normally energized current responsive means, means operably connecting said relay means to said normally closed switch means and operable to open the latter, means including a switch controlled by said communication controlling switch means for connecting said current responsive means to a communication circuit when said switch means connects the device to a communication circuit, means including switch means operable by said communication controlling switch means for grounding the interstation communication circuit when said device is connected to said amplifier, whereby the current responsive means at a station selecting another station whereat the device is connected to the amplifier is grounded and operated to open said normally closed switch means, and means including switch means operable by said current responsive means for connecting said current responsive means to the circuit when said means is operated.

4. A unit for an intercommunicating system including an amplifier having an input and an output, a communication circuit, means including a plural position communication direction controlling switch and amplifier input and output circuits controlled by it for controlling the connection of said circuit to the input or output of said amplifier in different positions of said switch, and means for preventing the connection of said amplifier to said communication circuit in either position of said switch under predetermined conditions of said communication circuit, said last mentioned means including a normally closed switch in said communication circuit and current responsive means connected to the circuit and controlled in response to the busy condition of said circuit operably connected to said switch for opening it.

5. A unit for an intercommunicating system including an amplifier having an input and an output, a communication circuit, means including a plural position communication direction controlling switch and amplifier input and output circuits controlled by it for controlling the connection of said circuit to the input or output of said amplifier in different positions of said switch, and means for preventing the connection of said amplifier to said circuit in either position of said switch in the event said circuit is busy, said last mentioned means including a normally closed switch in said communication circuit, a first current responsive means operably connected to said switch for opening it, means including a current operated busy circuit responsive means controlling the energization of said first current responsive means, and means connecting said busy circuit responsive means to said communication circuit.

6. A unit for an intercommunicating system including an amplifier having an input and an output, a communication circuit, means including a plural position communication direction controlling switch and amplifier input and output circuits controlled by it; means for controlling the connection of said circuit to the input or output of said amplifier in different positions of said switch, and means for preventing the connection of said amplifier to said circuit in either position of said switch under busy conditions of said circuit, said last mentioned means including a normally closed switch in said circuit, a single current responsive means operably connected to said switch means, means including switch means operable by said communication direction control switch and normally closed switch means operable by said current responsive means for connecting said current responsive means to said communication circuit, and means including other switch means operable by said current responsive means upon its operation and circuits controlled by it for connecting said current responsive means to said communication circuit independently of said communication direction controlling switch means.

7. A unit for an intercommunicating system including an amplifier having an input and an output, a communication circuit, means including a plural position communication direction controlling switch and amplifier input and output circuits controlled by it for controlling the connection of said circuit to the input or output of said amplifier in different positions of said switch, and means for preventing the connection of said amplifier to said circuit in either position of said switch in the event said circuit is busy, said last mentioned means including a normally closed switch in said circuit, a single current responsive means operably connected to said switch and closing said switch in one position of said current responsive means and operable to another position to open said switch, means including said communication direction controlling switch and circuits controlled by it for connecting said current responsive means to said communication circuit in said one position of said current responsive means thereby to render it responsive to a busy condition of the circuit, and means including said communication direction controlling switch, switch means operable by said current responsive means and circuits controlled thereby for connecting said current responsive means to said communication circuit in said other position of said current responsive means.

8. A unit for use in an intercommunicating system including an amplifier having an output circuit, an electroacoustical translating device, a communication circuit, means including a communication direction control switch and amplifier and device circuits closeable by said switch for connecting said communication circuit to the output of the amplifier or to said device, current responsive means connected to said communication circuit, and a normally closed switch in said communication circuit operable by said current responsive means to open said communication circuit.

9. An intercommunicating unit including a communication circuit, electroacoustical translating means, and means including a two position busy station responsive control means for connecting said translating means to said circuit in its two positions said last mentioned means including a pair of normally closed and normally open circuits and switch means in said circuits operable by said control means for selectively completing said circuits and connecting said translating device to said communication circuit, said switch means normally closing one circuit and normally opening the second circuit in one position of said control means and opening said one circuit and closing the second in the other position of said control means, and amplifier means connected only in the circuit between said translating means and said normally closed circuit.

10. An intercommunicating system including one or more stations of a first type and one or more stations of a second type all including electroacoustical translating means, amplifying means, a communication circuit and communication control means controlling the connections of said circuit to said translating and amplifying means, interstation circuits between said stations connectible to the communication circuits, busy station responsive means at the stations of the first type connected to the communication circuits thereat and including switch means for breaking said communication circuit and signal means operable thereby, signaling means at stations of the second type for operating said responsive means to operate said signal means and to break said communication circuit whereby stations of the second type can call said stations of the first type, and control means for the busy station responsive means at stations of the first type for returning said responsive means to its initial condition for remaking said communication circuit and returning said signal means to its nonoperated condition.

RICHARD H. CAMPBELL.

References Cited in the file of this patent

UNITED STATES PATENTS

| Number | Name | Date |
|---|---|---|
| 2,099,442 | Howell | Nov. 16, 1937 |
| 2,107,817 | Davis | Feb. 8, 1938 |
| 2,162,369 | Campbell | June 13, 1939 |
| 2,249,456 | Campbell | July 15, 1941 |
| 2,269,141 | Campbell | Jan. 6, 1942 |
| 2,269,142 | Campbell | Jan. 6, 1942 |
| 2,269,143 | Campbell | Jan. 6, 1942 |
| 2,269,144 | Campbell | Jan. 6, 1942 |
| 2,275,405 | Berkley | Mar. 10, 1942 |
| 2,326,616 | Campbell | Aug. 10, 1943 |
| 2,326,617 | Campbell | Aug. 10, 1943 |